United States Patent [19]

Lyle, Jr.

[11] Patent Number: 4,625,547

[45] Date of Patent: Dec. 2, 1986

[54] BOREHOLE GRAVIMETRY LOGGING

[75] Inventor: W. D. Lyle, Jr., Grapevine, Tex.

[73] Assignee: Mobil Oil Corporation, New York, N.Y.

[21] Appl. No.: 812,025

[22] Filed: Dec. 23, 1985

[51] Int. Cl.⁴ .............................. G01V 7/00
[52] U.S. Cl. ........................ 73/152; 73/151
[58] Field of Search .......... 73/152, 151, 382 R, 73/382 G; 166/250; 364/422

[56] References Cited

U.S. PATENT DOCUMENTS

| 4,397,181 | 8/1983 | Caldwell | 73/152 |
| 4,399,693 | 8/1983 | Gournay | 73/152 |
| 4,419,887 | 12/1983 | Gournay | 73/152 |
| 4,475,386 | 10/1984 | Fitch et al. | 73/151 |
| 4,513,618 | 4/1985 | Lautzenhiser | 73/382 G |
| 4,517,836 | 5/1985 | Lyle, Jr. et al. | 73/152 |
| 4,535,625 | 8/1985 | Lyle, Jr. | 73/152 |

Primary Examiner—Stephen A. Kreitman
Assistant Examiner—Scott M. Oldham
Attorney, Agent, or Firm—A. J. Mckillop; Michael G. Gilman; George W. Hager, Jr.

[57] ABSTRACT

A borehole gravimetry survey is carried out by making gravity measurements at a plurality of measurement stations along an interval of the borehole. A moving average gradient is determined for gravity measurements taken from consecutive pairs of such measurement stations over the borehole interval. Each moving average gradient is inverse filtered to reduce the effect of the weighted averaging on the gravity measurements, thereby increasing the vertical resolution of the data.

5 Claims, 3 Drawing Figures

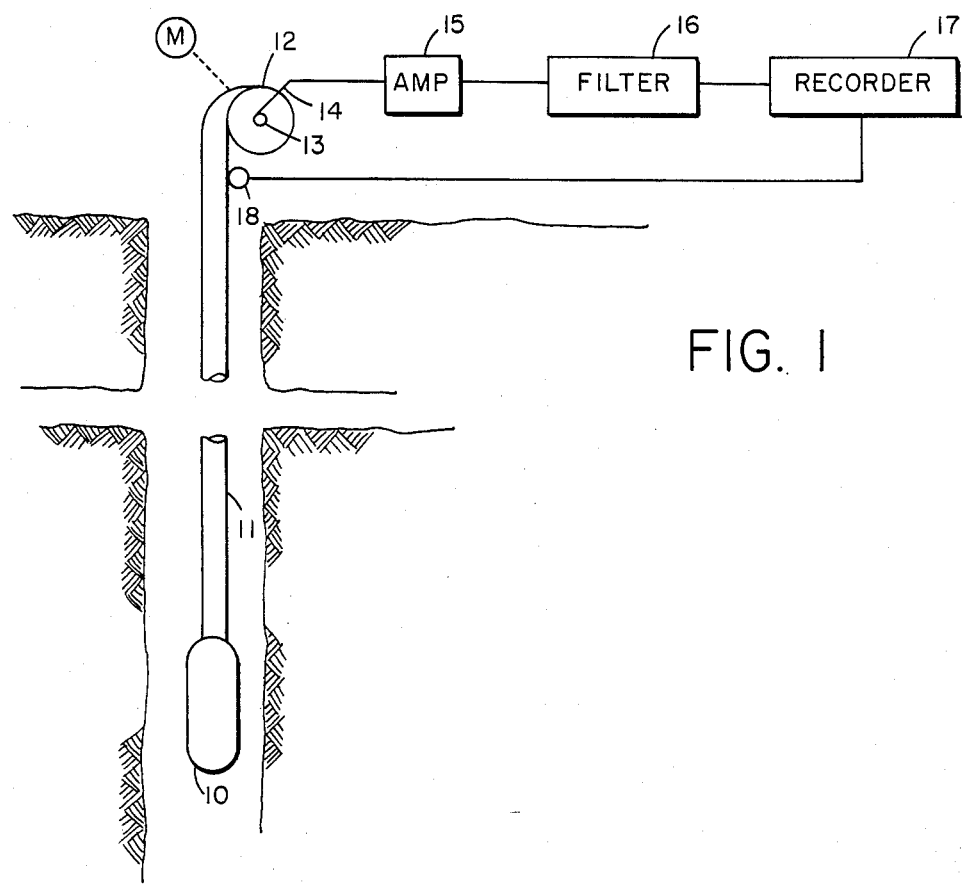
FIG. 1
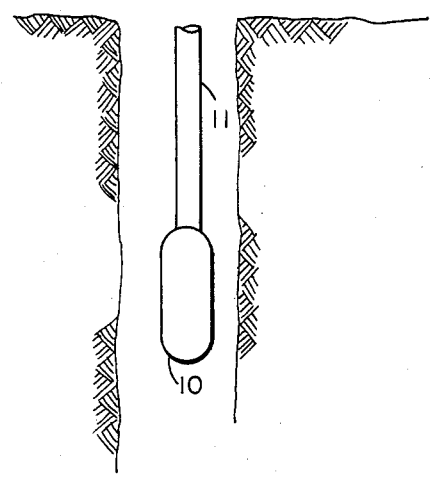
FIG. 2
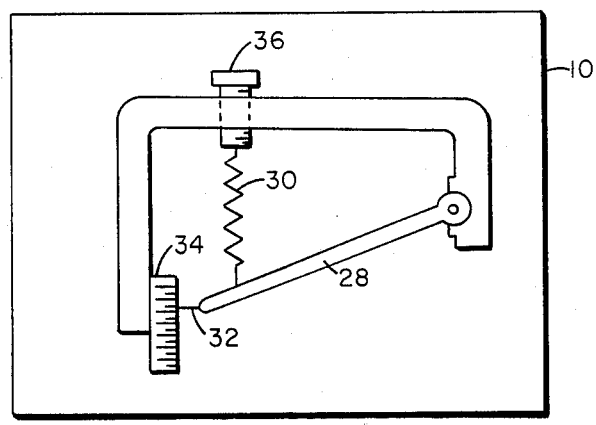

BOREHOLE GRAVIMETRY LOGGING

BACKGROUND OF THE INVENTION

Borehole gravimetry has now been developed into a reasonably reliable tool for oil well logging. Borehole gravimetric techniques provide an indication of the bulk density of formation rock surrounding the borehole being logged. Gravimetric logging services now commercially available include that provided by Exploration Data Consultants (EDCON) of Denver, Co., using a gravity meter of the type developed by LaCoste and Romberg. If accurate measurements of porosity of the formation rock are available, the residual oil saturation can be calculated to a high degree of accuracy. One such application of borehole gravimetry logging in the determination of residual oil saturation in a subsurface formation is set forth in U.S. Pat. 4,399,693, to L. S. Gournay.

SUMMARY OF THE INVENTION

In accordance with the present invention, there is provided a borehole gravimetry survey for improving the vertical resolution of borehole gravity measurements. An interval is selected along the borehole over which gravity gradients are to be determined. A plurality of gravity measurement stations are selected at spaced-apart positions along the selected interval. Gravity measurements are taken at each of the gravity measurement stations. A moving average gradient is determined for gravity measurements taken for consecutive pairs of gravity measurement stations in the selected interval. Each moving average gradient is inverse filtered to reduce the effect of the weighted averaging on the gravity measurements, thereby providing a higher vertical resolution of the gravity gradients.

More particularly, the moving average gradient is determined by calculating a gravity gradient over a select subinterval with the selected borehole interval, such subinterval spanning a plurality of consecutive ones of said gravity measurement stations, and repeating such calculation for a plurality of overlapping subintervals with the select borehole interval. Such overlapping subintervals are spaced vertically from each other by multiples of the separation between the gravity measurement stations. The moving average gradient is inverse filtered to remove the effect of the weighted averaging on the gravity measurements, thereby providing a higher vertical resolution of the gravity gradients.

BRIEF DESCRIPTION OF THE DRAWINGS

FIG. 1 illustrates a borehole gravimetry system of the prior art.

FIG. 2 illustrates a borehole gravity meter suitable for use in carrying out borehole gravity surveys.

DESCRIPTION OF THE PREFERRED EMBODIMENT

Figure 3:
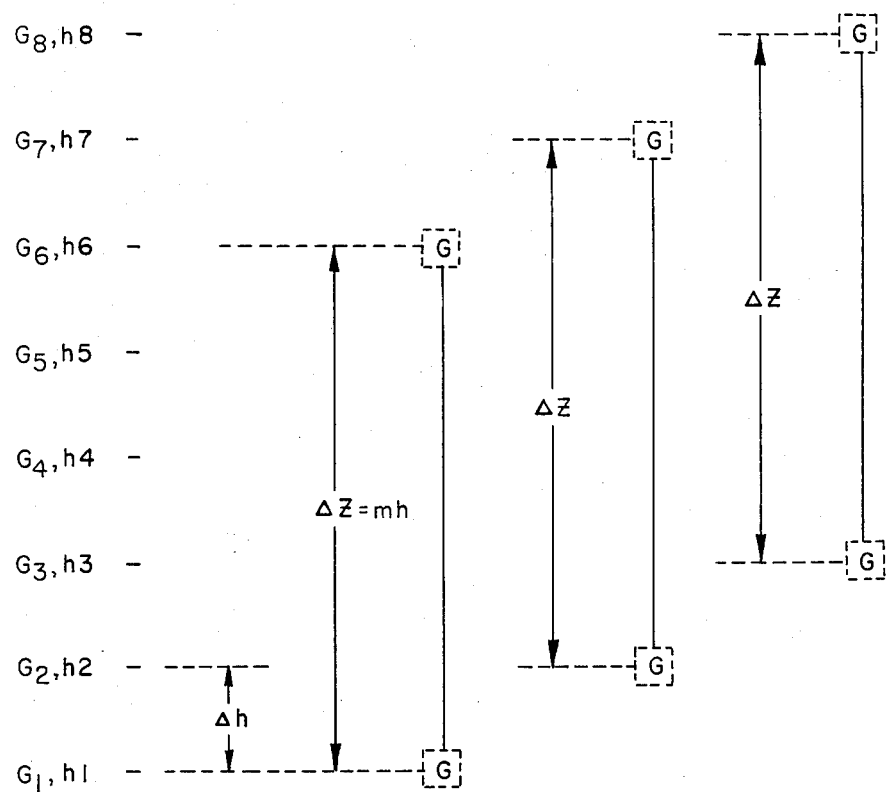
FIG. 3 is a diagrammatic representation of the borehole gravity survey to be carried out by the borehole gravimetry system of FIG. 1.

As mentioned above, borehole gravimetry has now been developed into a reasonably reliable tool for oil well logging. The general arrangement of gravimetry exploration operations is shown in FIG. 1. The LaCoste- and Romberg-type gravity meter 10 is passed down through a well extending from the surface of the earth through formations of various types until the area of interest is reached. The gravity meter 10 is lowered by means of a cable 11 running over a sheave 12 to the depth of interest. Gravimetric measurements, yielding signals proportional to the density of the surrounding formation, are then made and conducted by way of slip rings 13 and brushes 14 to an amplifier 15, a filter 16, and a recorder 17 to produce a log of gravity measurements as a function of depth. This is a log of true gravity over the depth interval of interest, such depth interval being measured by the reel 18 rotatably coupled to the cable 11.

FIG. 2 shows a schematic depiction of the LaCoste and Romberg gravity meter; other types of gravity meters are within the scope of the present invention. A lever 28 is pivoted more or less against the bias of a spring 30 in accordance with the vertical component of the earth's gravity in its immediate locale. This meter is capable of yielding results proportional to the density of the formation within a radius of about 100 feet of the borehole itself. A pointer 32 is affixed to the end of the pivoted lever 28 and indicates a point on a scale 34. The spring 30 is connected to a preload screw 36 which is moved in order to cause the lever pointer 32 to reach a predetermined index point on the scale 34. The amount of adjustment of the preload required to index the pointer 32 is proportional to local variations in gravity; thus, the preload adjustment is effectively the data output by the gravity meter 10. The meter is sealed within an enclosed container before being passed down the hole.

The borehole gravity meter, as the name implies, simply measures the vertical component of the earth's gravitational acceleration at a desired depth in the borehole. Given measurements at two different depths, one obtains the gravitational gradient and can proceed to compute the formation bulk density $\rho_b$ from the following equation:

$$\rho_b = \frac{F - (\Delta g/\Delta Z)}{4 \pi G} \qquad (1)$$

where

F is the free air gradient;

$\Delta g$ is the gravity difference between the two readings;

$\Delta Z$ is the vertical distance between gravity measurement stations; and

G is the universal gravitation constant.

Written in units of microgals (one gal = 1 cm/sec$^2$) for $\Delta g$, gm/cc for $\rho_b$, and feet for $\Delta Z$, we have $$\rho_b = 3.687 - 0.039185 \, \Delta g/\Delta Z. \qquad (2)$$

The bulk density $\rho_b$ is representative of the horizontal slab of material that lies within $\Delta Z$; it is the accurate determination of $\rho_b$ by gravimetric techniques which makes a reliable residual oil determination feasible.

As noted above, the gravity meter of FIG. 2 is of conventional design, its details forming no part of the present invention. Similarly, the operations shown schematically in FIG. 1 are presently commercially available from logging contractors and similarly form no part of the present invention. Instead, the present invention relates to the use of the borehole gravity meter in a borehole gravimetry survey that enhances vertical resolution of the desired formation bulk density that has not been achievable with prior art borehole gravimetry surveys.

More particularly, a conventional borehole gravimetry survey is carried out by lowering the borehole gravity meter to the lowest point in the well for which a gravity measurement is desired. A measurement of the gravitational acceleration is made and then the borehole gravity meter is moved some distance $\Delta Z$ up the borehole to the next point at which a gravitation measurement is desired. The measurement points are called stations. The borehole gravity meter is stopped at each station for a period of several minutes during the time the gravitational measurement is being taken. These gravitational measurements usually require corrections for changes in the gravitational acceleration due to tidal effects, measurement inaccuracies due to the changing characteristics of the meter itself (i.e., meter drift), the free-air effect, and possible structural and terrain distortion. After the gravitational measurements have been corrected, the gradient $\Delta G_{i-j}$ between stations i and j is calculated as follows:

$$\Delta G_{i-j} = \frac{G_i - G_j}{\Delta Z_{ij}} \Delta X_{i-j} \quad (3)$$

where $G_i$ = corrected gravity value at station i, and
$G_j$ = corrected gravity value at station j.

This gradient, $\Delta G_{i-j}$, allows calculation of the density of the volume of subsurface formation lying between the measurement stations i and j as shown in the above equation (1). The gradient is assigned to the midpoint between the measurement stations. Borehole gravimetry surveys have been conducted by sequentially moving the gravity meter through a series of stations. Limitations on meter accuracy require that station separation be ten feet or greater in order to obtain accurate gradients. Consequently, the formation density determinations have been limited in vertical resolution to ten feet or greater.

It is the specific feature of the present invention to carry out a borehole gravimetry survey which maintains the required station separations of ten or more feet for accurate gradient determination while, at the same time, yielding formation density of much improved vertical resolution of two-to-three feet, for example. Such an increase in vertical resolution can be applied to locating by-passed hydrocarbons in old cased wells as well as to residual oil saturation determination.

The borehole gravimetry survey of the present invention improves vertical resolution by providing for a moving average gravity gradient which can be inverse filtered to produce a much greater vertical resolution than could be possible by taking gravity measurements with spacings less than the usual ten or more feet. This increase in vertical resolution is accomplished without decreasing the large radius of investigation associated with the ten-foot (or greater) station separation. Such a survey will now be described in detail taken in conjunction with FIG. 3.

Referring now to FIG. 3, a borehole interval is selected over which the moving average gravity gradient of the present invention is to be determined. The entire interval is then partitioned into a sequence of non-overlapping subintervals of equal vertical separation $\Delta h$. The logging operation is begun by obtaining a gravity value at a first station, such as $h_1$. Then the borehole gravimetry system is moved a distance $\Delta h$ to station $h_2$. This last step is in sharp contrast to the usual procedure of moving the borehole gravimetry system the full distance $\Delta Z$ for the next measurement, where:

$$\Delta Z = M \Delta h, \quad (4)$$

and M is an integral multiple selected to provide an accurate gravity gradient determination. No attempt is to be made to calculate the gradient over the interval of width $\Delta h$, but rather a series of measurements separated by width $\Delta h$ are to be made. These measurements are then paired by choosing measurement pairs separated by $\Delta Z$ with the gradient calculated between these pairs. However, taking the measurements $\Delta h$ units apart leads to a moving average gradient log. For the example of a 15-foot moving gradient taken over a plurality of three-foot measurement stations, the foregoing steps of the present invention can be expressed as follows:

$$g_3 = \frac{G_1 - G_6}{15} = \frac{1}{5}\left[\frac{G_1 - G_2}{3} + \frac{G_2 - G_3}{3} + \frac{G_3 - G_4}{3} + \frac{G_4 - G_5}{3} + \frac{G_5 - G_6}{3}\right] \quad (5)$$

where $G_1$ through $G_6$ are the gravity measurements taken at stations $h_1$ through $h_6$ and 1/5 is ratio of $\Delta h$ to $\Delta Z$. In equation (5), it is seen that $g_3$ is the average of the unmeasurable gradients over the smaller $\Delta h$ intervals. Likewise, $$g_4 = \frac{G_2 - G_7}{15} = \frac{1}{5}\left[\frac{G_2 - G_3}{3} + \frac{G_3 - G_4}{3} + \frac{G_4 - G_5}{3} + \frac{G_5 - G_6}{3} + \frac{G_6 - G_7}{3}\right], \quad (6)$$

and is assigned to the midpoint between stations $h_2$ and $h_7$. Denoting the value of the gradient of the three-foot interval between station i and station i+1 by $X_i$, Equation (5) can be written as:

$$g_3 = \frac{1}{5} \sum_{k=-2}^{2} X_{3-k} \quad (7)$$

and Equation (6) becomes:

$$g_4 = \frac{1}{5} \sum_{k=-2}^{2} X_{4-k} \quad (8)$$

where, for example:

$$X_3 = \frac{G_3 - G_4}{3} \quad (9)$$

is the gradient over the three-foot interval between station $h_3$ and station $h_4$ at which measurements $G_3$ and $G_4$ were obtained. It is important to note that meter inaccuracies prohibit accurate direct determination of the X terms due to the short separation, but the g terms, such as given by Equations (7) and (8), can be accurately determined. However, inverse filtering will allow determination of the X values from a moving average with average values given by the g terms.

Equations (5) and (6) can, therefore, be generally written as:

$$g_i = \frac{1}{M} \sum_{j=-k}^{k} X_{i-j}, \quad M \text{ odd}, \quad k = \frac{M-1}{2} \quad (10)$$

or $$g_i = \frac{1}{M} \sum_{j=-k+1}^{k} X_{i-j}, \quad M \text{ even}, \quad k = \frac{M}{2} \quad (11)$$

with M related to $\Delta Z$ and $\Delta h$ by Equation (4).

Equations (10) and (11) are in a form for which inverse filtering will calculate the X values from a sequence of g values even though the X values are themselves not reliably attainable during the logging operation.

Therefore, if a gravity survey is properly designed, the gradients can be determined over distances for which direct measurement alone will not produce accurate gradients. Proper survey design and inverse filtering can, therefore, produce the higher resolution gradients. This fact has not been recognized in the past and, consequently, high resolution gradient logs have not been obtained. Immediate applications of such high resolution gravity gradient surveys are for detection of bypassed hydrocarbons.

Any inverse filtering technique then can determine the X values in equations (10) and (11) from the g values and can be utilized with a much greater increase in resolution than is possible by taking gravity measurements with spacings of less than about 10 feet. One such inverse filtering technique is described by M. R. Foster, W. G. Hicks and J. T. Nipper in "Optimum Inverse Filters Which Shorten the Spacing of Velocity Logs," *Geophysics*, Vol. 27, No. 3, June 1962, pp. 317-326. Another approach was introduced by R. E. Kalman in "A New Approach to Linear Filtering and Prediction Problems," *Journal of Basic Engineering*, Vol. 82, pp. 35-45, March 1960. This approach, which made possible recursive processing of measurement data in a computationally efficient manner, is further described by J. W. Bayless in "Application of the Kalman Filter to Continuous Signal Restoration," *Geophysics*, Vol. 35, No. 1, Feb. 1970, pp. 2-36, and by W. D. Lyle, "Method of Increasing The Vertical Resolution of Well Log Data", U.S. Pat. No. 4,535,625, issued Aug. 20, 1985. Inverse filtering of the gravity data contained in the moving average gradient of the present invention reduces the effect of the weighted averaging on the gravity measurements, thereby providing higher vertical resolution of the gravity gradients. As a consequence, the possibility of locating hydrocarbon zones which had been bypassed in old wells due to lower resolution data is greatly enhanced.

While a preferred embodiment of the invention has been described and illustrated, numerous modifications or alterations may be made without departing from the spirit and scope of the invention as set forth in the appended claims.

I claim:

1. A method for conducting a borehole gravimetry survey, comprising the steps of:
    (a) selecting an interval along the borehole over which gravity gradients are to be determined,
    (b) selecting a plurality of gravity measurement stations at equally spaced, vertical points along said interval,
    (c) carrying out gravity measurements at each of said gravity measurement stations, and
    (d) determining a moving average gradient for gravity measurements from selected pairs of said gravity measurement stations over said interval.

2. The method of claim 1, wherein said step of determining a moving average gradient comprises the steps of:
    (a) calculating a gravity gradient over a select subinterval within said select borehole interval, said subinterval spanning a plurality of consecutive ones of said gravity measurement stations, and
    (b) repeating step (a) for a plurality of overlapping subintervals within said select borehole interval.

3. The method of claim 2 wherein said plurality of overlapping subintervals are spaced vertically from each other by multiples of the separation between said gravity measurement stations.

4. The method of claim 2 wherein steps (a)-(b) are expressed by the following:

$$g = 1/M \sum_{j=-k}^{+k} X_{i-j}$$

where
i = gravity measurement station i,
j = gravity measurement station j,
$1/M = \Delta h / \Delta Z$,
$\Delta h$ = distance between gravity measurement stations i and j,
$\Delta Z$ = length of the interval over which the gravity gradients are to be calculated, $$X_{i-j} = \frac{G_i - G_j}{\Delta h}$$

$G_i$ = gravity measurement at station i,
$G_j$ = gravity measurement at station j, and
g = moving average gradient assigned to the midpoint of the interval between stations i and j.

5. The method of claim 1 further including the step of inverse filtering said moving average gradient for said interval to reduce the effect of the weighted averaging on the gravity measurements, thereby providing a higher vertical resolution of the gravity gradients.

* * * * *